(12) United States Patent
Schlesener et al.

(10) Patent No.: US 7,624,175 B1
(45) Date of Patent: Nov. 24, 2009

(54) UPDATE MESSAGING SYSTEM

(75) Inventors: Matthew C. Schlesener, Olathe, KS (US); Pallavur A. Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1406 days.

(21) Appl. No.: 10/700,187

(22) Filed: Nov. 3, 2003

(51) Int. Cl.
*G06F 13/00* (2006.01)
(52) U.S. Cl. ............... 709/224; 709/219; 709/249
(58) Field of Classification Search ............ 709/217, 709/219, 223, 225, 227, 229, 238, 249, 250
See application file for complete search history.

(56) References Cited

U.S. PATENT DOCUMENTS 7,024,214 B2 * 4/2006 Loveland .............. 455/502
7,161,914 B2 * 1/2007 Shoaib et al. .......... 370/331
7,310,339 B1 * 12/2007 Powers et al. .......... 370/394

OTHER PUBLICATIONS

Schlesener, Matthew C., Performance Evaluation of Telephony Routing Over IP (TRIP), Kansas State University, Nov. 25, 2002, Master's of Science Thesis.
Schlesener, Matthew C., "Performance Evaluation of Telephony Routing over IP (TRIP)" power point presentation for Master's of Science Thesis, University of Kansas, Nov. 25, 2002.

* cited by examiner

*Primary Examiner*—Viet Vu

(57) ABSTRACT

An update messaging system comprising a first interface configured to receive a first update message from a first gateway into a first location server wherein the first update message indicates a first type of message for the first update message, and a first processing system configured to determine a priority associated with the first update message based upon the first type of message for the first update message.

40 Claims, 8 Drawing Sheets

UPDATE MESSAGING SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to Internet technologies, and in particular, to update messaging systems and methods.

2. Description of the Prior Art

Internet systems route communications over the Internet by packaging the communications within data packets and transporting the packets according to routing instructions contained in the packets. Routing voice communications over the Internet occurs in a similar manner. A typical internet telephony system that includes an originating telephone and a destination telephone both connected to the Internet can route packets carrying communications without leaving the Internet. However, to bridge Internet telephony calls originating on the Internet to destinations located off the Internet (such as a telephone connected to the public switched telephone network) requires media gateways to interface between the origin and the destination.

To effectively interface between Internet telephony systems and the PSTN, media gateways must be strategically located. Various other systems track the location and status of each individual gateway. In particular, location servers share responsibility for knowing the location and status of each gateway, and for initiating telephony sessions across the gateways utilizing the Session Initiation Protocol (SIP). SIP uses client-server interaction, with servers being divided into two types. A user runs a soft client on, for example, a SIP phone. It is assigned an identifier (e.g. SIPuser@domain.com) and can receive incoming calls. The second type of server is intermediate (i.e. sits between two SIP phones) and handles tasks such as call set up, call forwarding and call redirects. The intermediate server is called a SIP Proxy server. The location server is an entity built into the Proxy server. In a basic SIP network, the proxy server can forward an incoming call request to the next proxy server along the path to the called phone. It can also provide information back to a caller to provide destination information so that the caller can reach the destination SIP phone directly.

The location servers running on SIP proxies are Telephony Routing over Internet Protocol (TRIP) enabled. TRIP is a protocol established to effectuate messaging between location servers and gateways to keep track of the location and status of the gateways. TRIP does not run directly over IP. It must ride over a telephony protocol like SIP or H.323. IP does not provide the infrastructure (e.g. SIP proxy server and media gateway) nor the packet structure to provide what TRIP needs to do its very specific job (dynamic building of proxy server routing tables). The location server is a software entity of a SIP proxy. In a SIP only network, the location server is not used- the SIP proxy will use DNS (Domain Name Service) to look up where to forward call requests. In a TRIP enabled SIP network, the location server uses update messages from media gateways and other location servers to build a dynamic routing table that the SIP proxy uses to forward and redirect call requests.

FIG. 1 illustrates media gateway system 100 in the prior art. Media gateway system 100 includes location server 110, gateway 120, and PSTN 130. Gateway 120 is in communication with TRIP enabled location server 110 by SIP messaging, and in communication with PSTN 130 by signaling system 7 (SS7) messaging or some other similar messaging protocol. In the prior art, gateway 120 is TRIP-lite enabled. A SIP proxy runs TRIP enabled location server 110. When the status of gateway 120 changes, gateway 120 transmits TRIP-lite update messages to location server 110 indicating the status change. Location server 110 can then send TRIP messages to other TRIP enabled location servers to update the other location servers on the status of gateway 120. Currently, TRIP enabled systems utilize transport control protocol (TCP) for the transport of TRIP messaging.

A drawback to the current system is that TRIP-lite enabled gateways and TRIP enabled location servers have no ability to prioritize the processing of different types of messages. During periods of congestion, gateways and location servers have no ability to drop low priority messages.

SUMMARY OF THE INVENTION

An embodiment of the invention includes a method of operating an update messaging system, the method comprising, in a first location server, receiving a first update message from a first gateway wherein the first update message indicates a first type of message for the first update message, and determining a priority associated with the first update message based upon the first type of message for the first update message.

Some embodiments of the invention include dropping the first update message if the priority associated with the first update message requires dropping the first update message.

In some embodiments of the invention, dropping the first update message occurs in response to message congestion in the first location server.

Some embodiments of the invention include, in the first location server, receiving a second update message from the first media gateway wherein the second update message indicates a second type message for the second update message.

Some embodiments of the invention include determining a priority associated with the second update message based upon the second type of message for the second update message.

Some embodiments of the invention include dropping one of either the first update message or the second update message in order of the priorities associated with the first update message and the second update message.

Some embodiments of the invention include, in the first location server, receiving a third update message from a second media gateway wherein the third update message indicates a third type of message for the third update message and determining a priority associated with the third update message based upon the third type of message for the third update message.

Some embodiments of the invention include dropping one of either the first update message or the third update message in order of the priorities associated with the first update message and the third update message.

Some embodiments of the invention include, in a second location server, receiving a fourth update message from the first media gateway wherein the fourth update message indicates the first type of message for the fourth update message, and determining a priority associated with the fourth update message based upon the first type of message for the fourth update message.

Some embodiments of the invention include dropping the fourth update message if the priority associated with the fourth update message requires dropping the fourth update message.

In some embodiments of the invention, dropping the fourth update message occurs in response to message congestion in the second location server.

Some embodiments of the invention include, in the second location server, receiving a fifth update message from the first media gateway wherein the fifth update message indicates a fifth type of message for the fifth update message.

Some embodiments of the invention include determining a priority associated with the fifth update message based upon the fifth type of message for the fifth update message.

Some embodiments of the invention include dropping one of either the fourth update message or the fifth update message in order of the priorities associated with the fourth update message and the fifth update message.

Some embodiments of the invention include updating a routing table with information delivered in the first update message.

Some embodiments of the invention include receiving the first update message into the location server utilizing a stream control transport protocol (SCTP).

In some embodiments if the invention, the first media gateway comprises a telephony routing over internet protocol-lite (TRIP-lite) enabled gateway.

In some embodiments if the invention, the first location server comprises a telephony routing over internet protocol (TRIP) enabled location server.

In some embodiments if the invention, the first type indicates a route failure.

In some embodiments if the invention, the first type indicates adding new routes.

In some embodiments if the invention, the first type indicates keep alive messaging.

In some embodiments if the invention, the first type indicates dynamic resource statistics.

In some embodiments if the invention, the first type indicates load balancing statistics.

BRIEF DESCRIPTION OF THE DRAWINGS

The same reference number represents the same element on all drawings.

DETAILED DESCRIPTION OF THE PREFERRED EMBODIMENT

FIGS. 2-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 2-4

Figure 1:
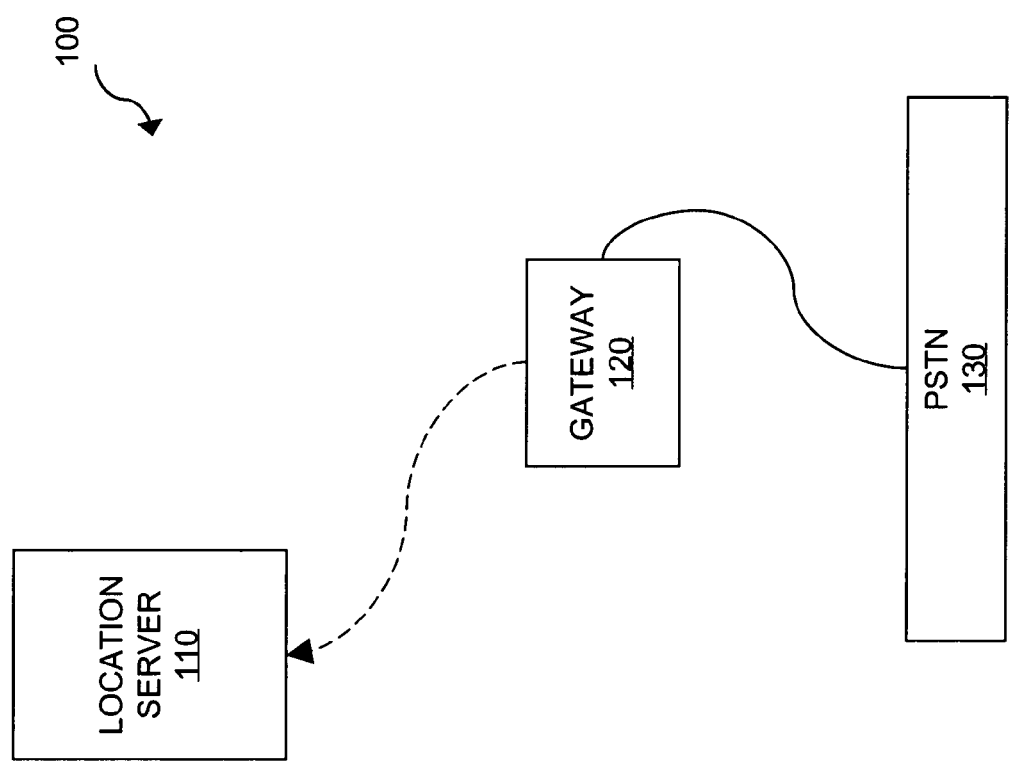
FIG. 1 illustrates a media gateway system in an example of the prior art.
Figure 2:
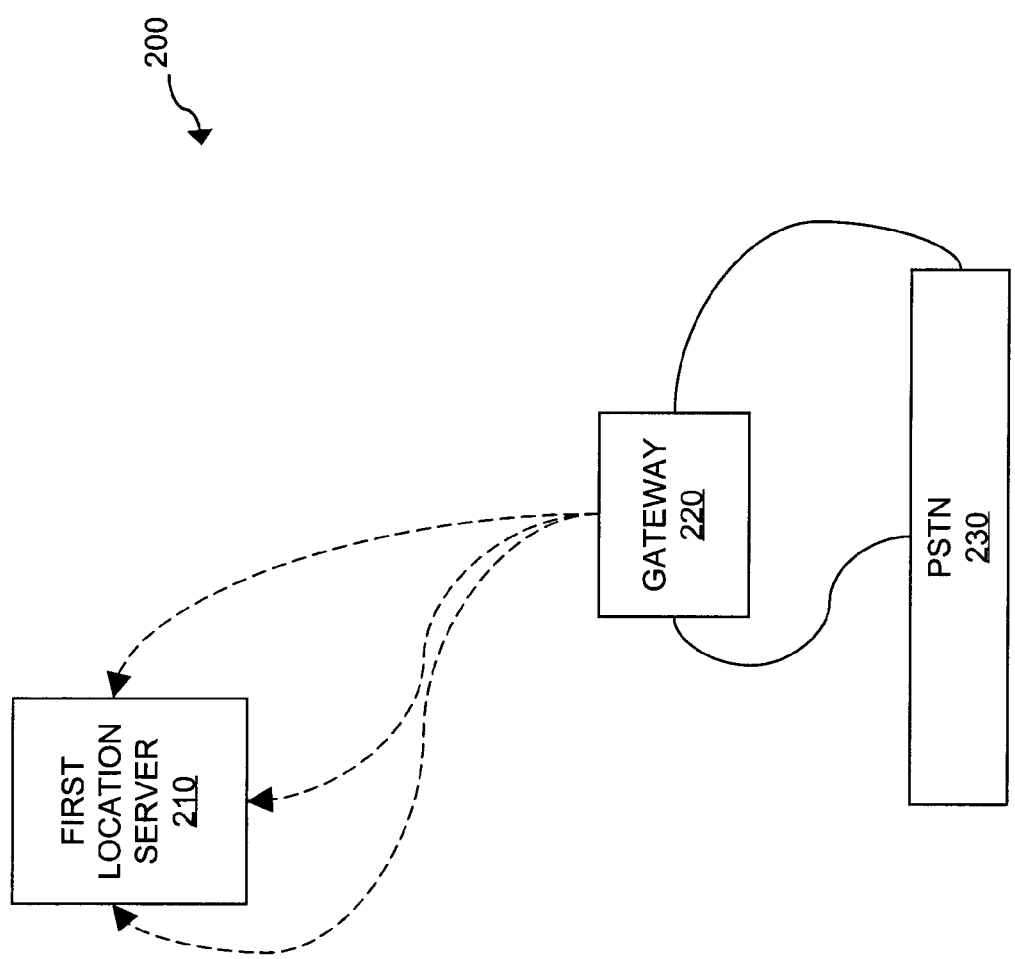
FIG. 2 illustrates an update messaging system in an embodiment of the invention.

FIG. 2 illustrates update messaging system 200 in an embodiment of the invention. Update messaging system 200 includes first location server 210, gateway 220, and PSTN 230. First location server 210 is in communication with gateway 220. Gateway 220 is in communication with PSTN 230 over SS7 signaling or some other signaling protocol. Gateway 220 provides a point for calls originating from PSTN 230 to SIP/IP telephony locations. Similarly, gateway 220 provides an exit point for SIP/IP telephony calls destined for locations on PSTN 230. Gateway 220 serves two different sectors of PSTN 230 as illustrated by the two connections from gateway 220 to PSTN 230. The two different sectors could be determined by area code.

Figure 3:
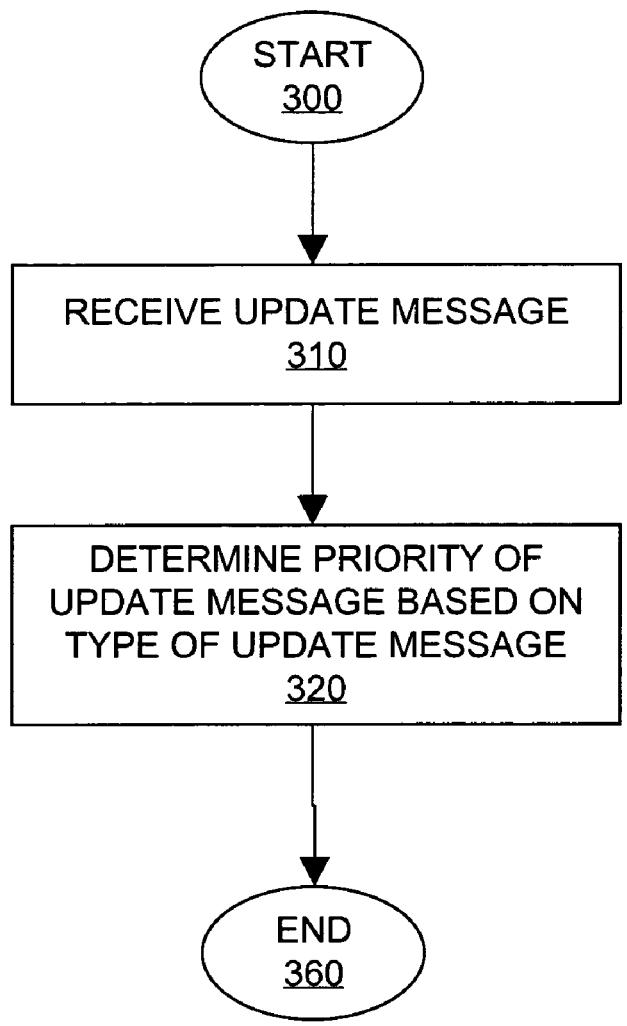
FIG. 3 illustrates the operation of an update messaging system in an embodiment of the invention.

FIG. 3 illustrates the operation of update messaging system 200 in an embodiment of the invention beginning at Step 300. Location server 210 receives a first update message from gateway 220 (Step 310). The first update message indicates a first type of message for the first update message. For example, the first type could indicate a gateway coming online, a route failure, adding new routes, message keep alive instructions, dynamic resource statistics, or load balancing statistics. The first type could indicate other types of messages which are not limited by the examples provided herein. Next, location server 210 determines a priority associated with the first update message based upon the first type of message for the first update message (Step 320). For example, location server 210 could designate a higher priority to route failure update messages than to messages containing load balancing statistics.

Figure 4:
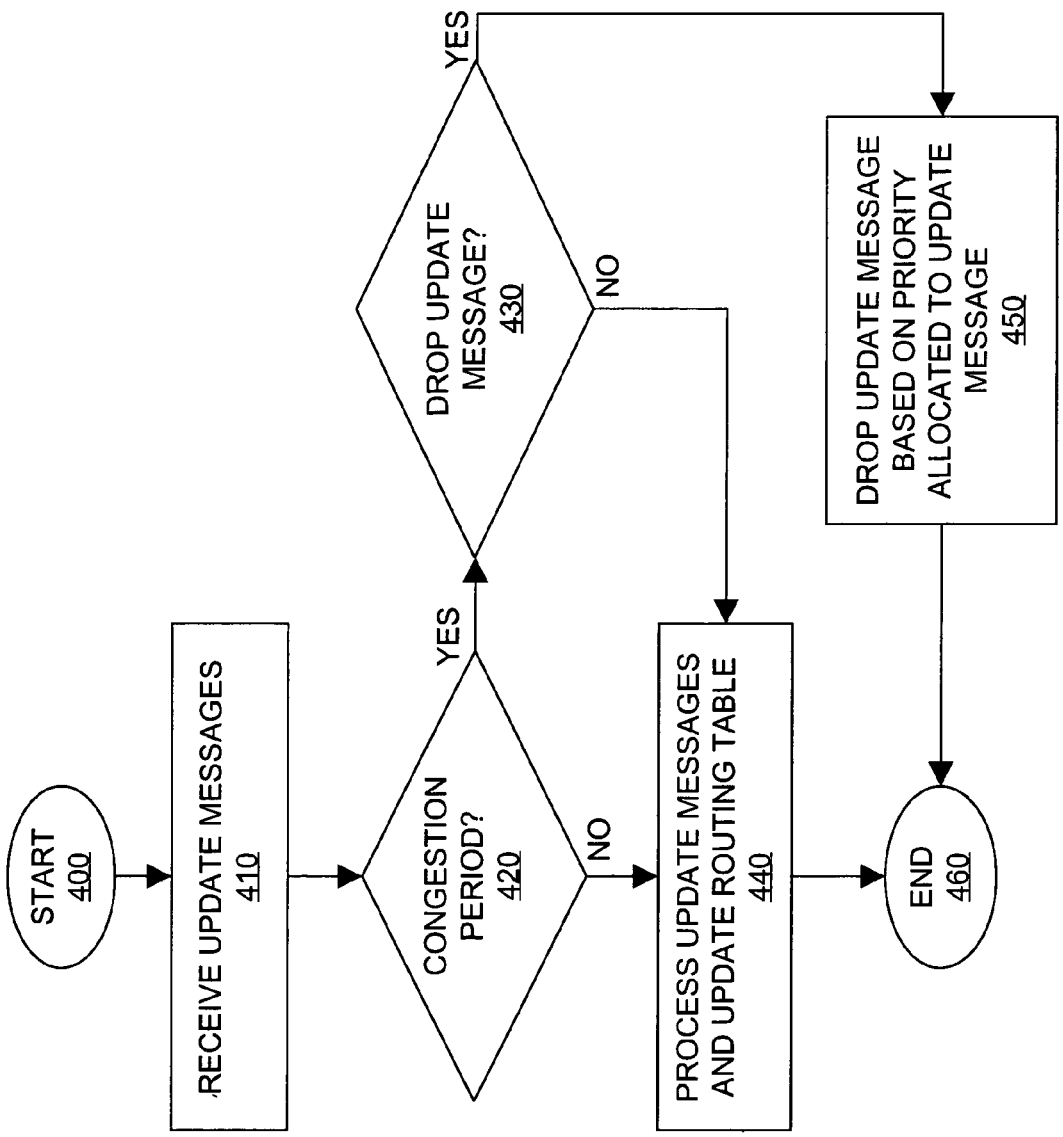
FIG. 4 illustrates the operation of an update messaging system in an embodiment of the invention.

FIG. 4 illustrates the operation of update messaging system 200 in another embodiment of the invention. Gateway 220 undergoes a status change (Step 400). The status change could comprise gateway 220 coming online, having a route through gateway 220 fail, adding new routes, instructing location server 210 to keep alive previous instructions, notifying location server 210 of dynamic resource statistics, or performing load balancing processes. In response to the status change or in response to some other event, gateway 220 transmits a plurality of messages to location server 210. For illustrative purposes, three update messages are depicted, although more messages are possible. The three messages represent a sequence of messages.

Location server 210 receives the update messages related to the status change (Step 410). Location server 210 simultaneously receives other messages from other location servers and other gateways. If location server 210 is in congestion (Step 420), location server 210 determines if dropping messages would relieve the congestion (Step 430). If location server 210 determines to drop messages, one of the update messages from gateway 220 is dropped based on the priority allocated to the one update message (Step 450). Location server 210 processes the update message and updates a gateway routing table if not in congestion (Step 440) or if none of the messages can be dropped. The process ends (Step 460) although the process could occur for the remaining messages received by location server 210, for the two remaining update messages of the message sequence, or for newly received messages.

Second Embodiment Configuration

FIG. 5

Figure 5:
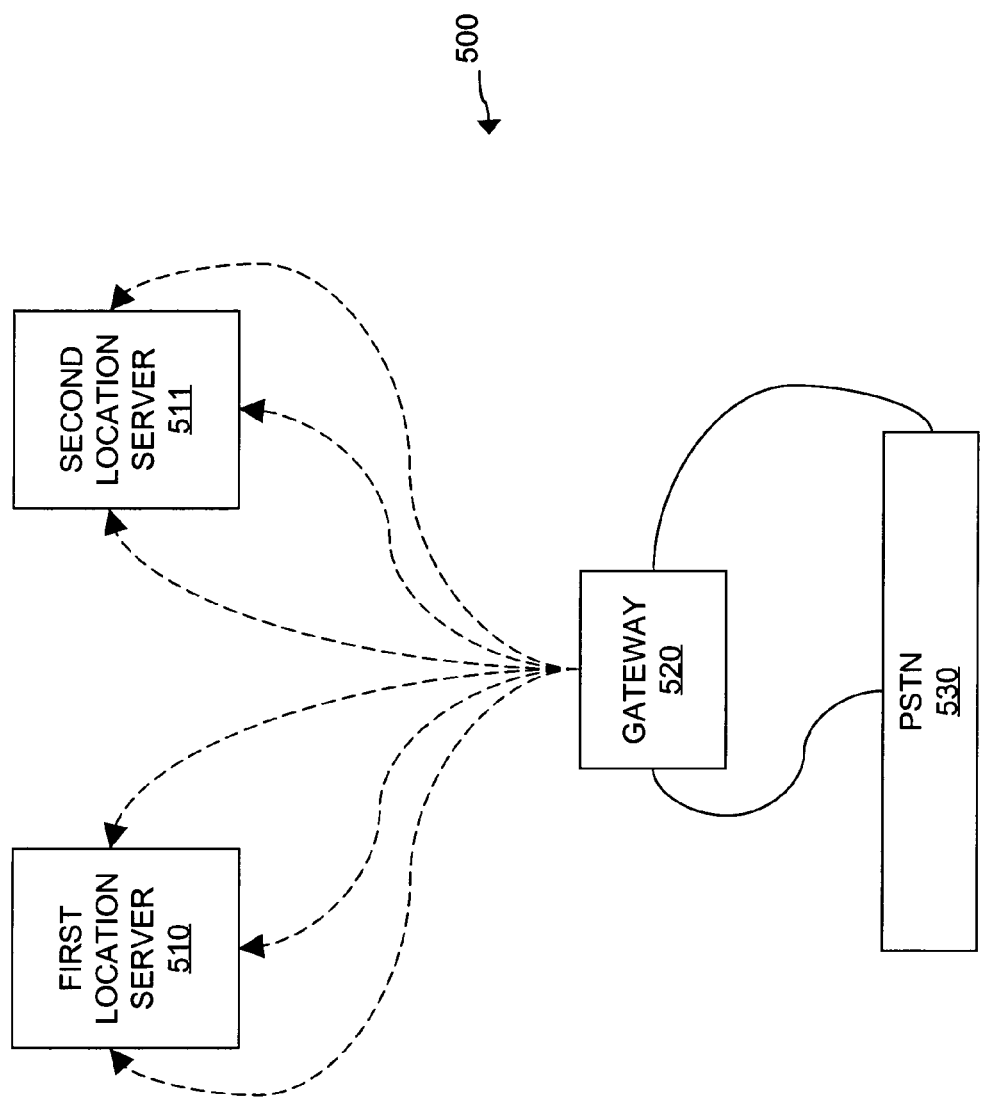
FIG. 5 illustrates an update messaging system in an embodiment of the invention.

FIG. 5 illustrates update messaging system 500 in an embodiment of the invention. Update messaging system 500 includes first location server 510, second location server 511, gateway 520, and PSTN 530. First location server 510 and second location server 511 are in communication with gateway 520 by TRIP over Stream Control Transport Protocol (SCTP) messaging. Gateway 520 is in communication with PSTN 530 over SS7 signaling or some other signaling protocol. Gateway 520 provides an entrance point for calls originating from PSTN 530 to SIP/IP telephony locations. Similarly, gateway 520 provides an exit point for SIP/IP telephony calls destined for locations on PSTN 530. Gateway 520 serves two different sectors of PSTN 530 as illustrated by the two connections from gateway 520 to PSTN 530. The two different sectors could be determined by area code.

In operation, gateway 520 undergoes a status change. The status change could comprise gateway 520 coming online, having a route through gateway 520 fail, adding new routes, instructing location server 510 to keep alive previous instructions, notifying location server 510 of dynamic resource statistics, or performing load balancing processes. The status change could be indicated in a TRIP over SCTP message within the header of the message by an alpha-numeric code or designation. Furthermore, the status change could be indicated by an alpha-numeric code or designation carried in the body of a TRIP over SCTP message. In response to the status change or in response to some other event, gateway 520 transmits a plurality of messages to first location server 510 and second location server 511. The type of messages transmitted by gateway 520 correspond to the type of status change to gateway 520. For illustrative purposes, three update messages transmitted to both location servers are depicted, although more messages are possible.

Gateway 520 transmits the plurality of messages utilizing TRIP over SCTP. SCTP is a reliable transport protocol that operates over IP or over user defined protocol (UDP) over IP. SCTP provides acknowledged error-free non-duplicated transfer of messages. Additionally, SCTP provides detection of data corruption and loss of data. Duplication of data is achieved by using checksums and sequence numbers. A selective retransmission mechanism is applied to correct loss or corruption of data TRIP over SCTP enables TRIP-lite enabled gateway 520 to provide the several streams within a connection to first location server 510 and second location server 511. This multi-homing allows TRIP enabled location servers to have associations to administratively specified other location servers to allow network administrators to apply policy at a more granular level.

Third Embodiment Configuration

FIG. 6

Figure 6:
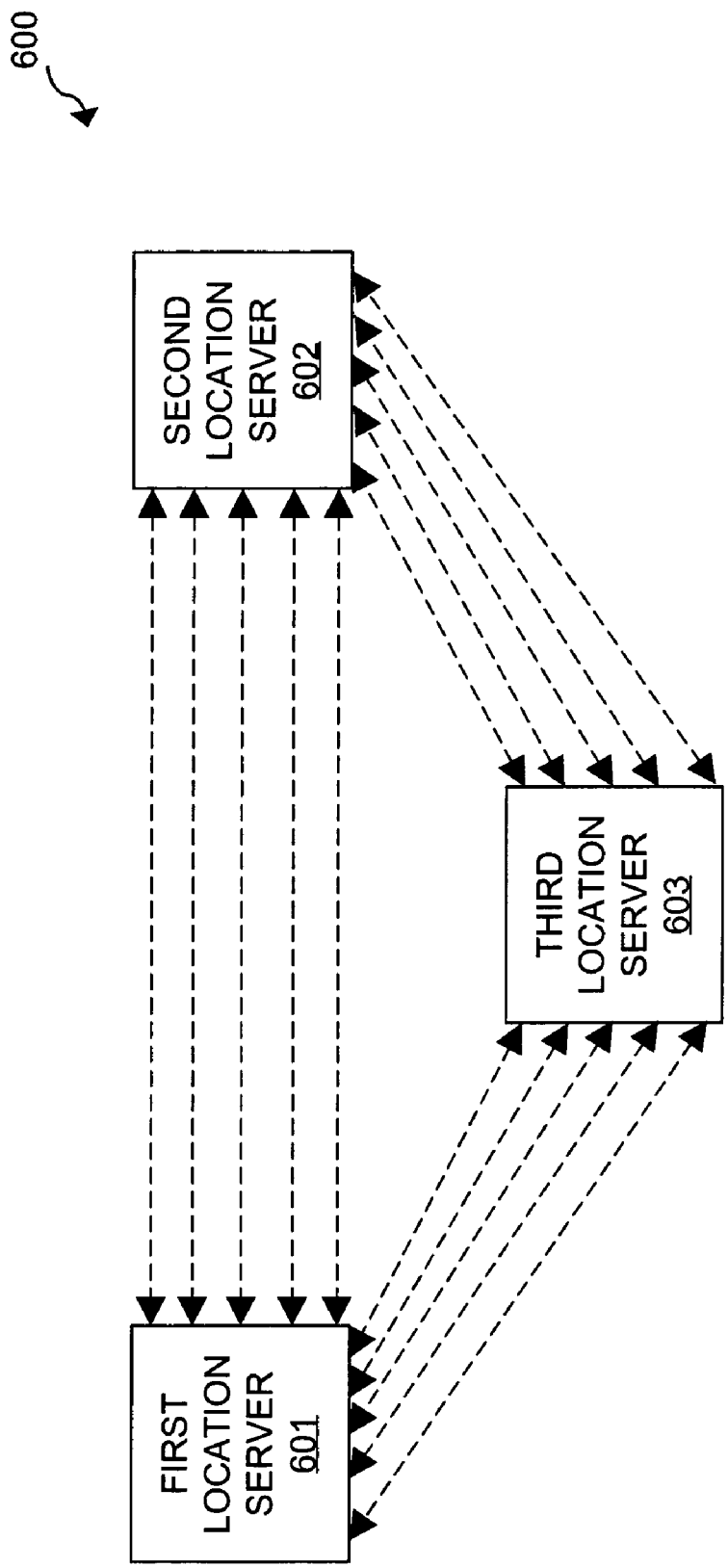
FIG. 6 illustrates an update messaging system in an embodiment of the invention.

FIG. 6 illustrates update messaging system 600 in an embodiment of the invention. Update messaging system 600 comprises first location server 601, second location server 602, and third location server 603. First location server 601, second location server 602, and third location server 603 each comprise TRIP enabled location servers and are in communication via SIP/IP messaging. Each location server 601, 602, 603 runs a TRIP application that updates a routing table upon receiving update messages from either gateways or other location servers. For example, to inform second location server 602 and third location server 603 of gateway updates, first location server 601 floods each location server 602, 603 with TRIP over SCTP update messages. By this action, second location server 602 and third location server 603 gain gateway status information on gateways connected to first location server 601.

During periods of congestion, second location server 602 and third location server 603 may be required to drop certain messages received from the message flood transmitted by first location server 601. For instance, second location server 602 prioritizes the messages received from first location server 601. Based on the priority of the messages and the level of congestion, second location server 602 is able to discard some of the messages based on priority. Second location server 602 might allocate a higher priority to route failure updates over dynamic resource statistic updates. Thus, second location server 602 would discard a dynamic resource statistic update to lessen congestion before discarding a route failure update. For each individual message received by second location server 602 an individual message acknowledgement can be transmitted to first location server 601.

It should be noted that each location server 601, 602, 603 operates in the same manner even though particular functions are not depicted for each location server. For example, second location server 602 could flood first and third location servers 601, 603 with update messages, and third location server 603 could flood first and second location servers 601, 602 with update messages. FIG. 6 depicts five flows amongst each location server 601, 602, 603 which represent five different types of TRIP over SCTP messages. In this example, one stream comprises five flows. The individual flows within a single stream enable the congestion prioritization described above.

Fourth Embodiment Configuration

FIG. 7

Figure 7:
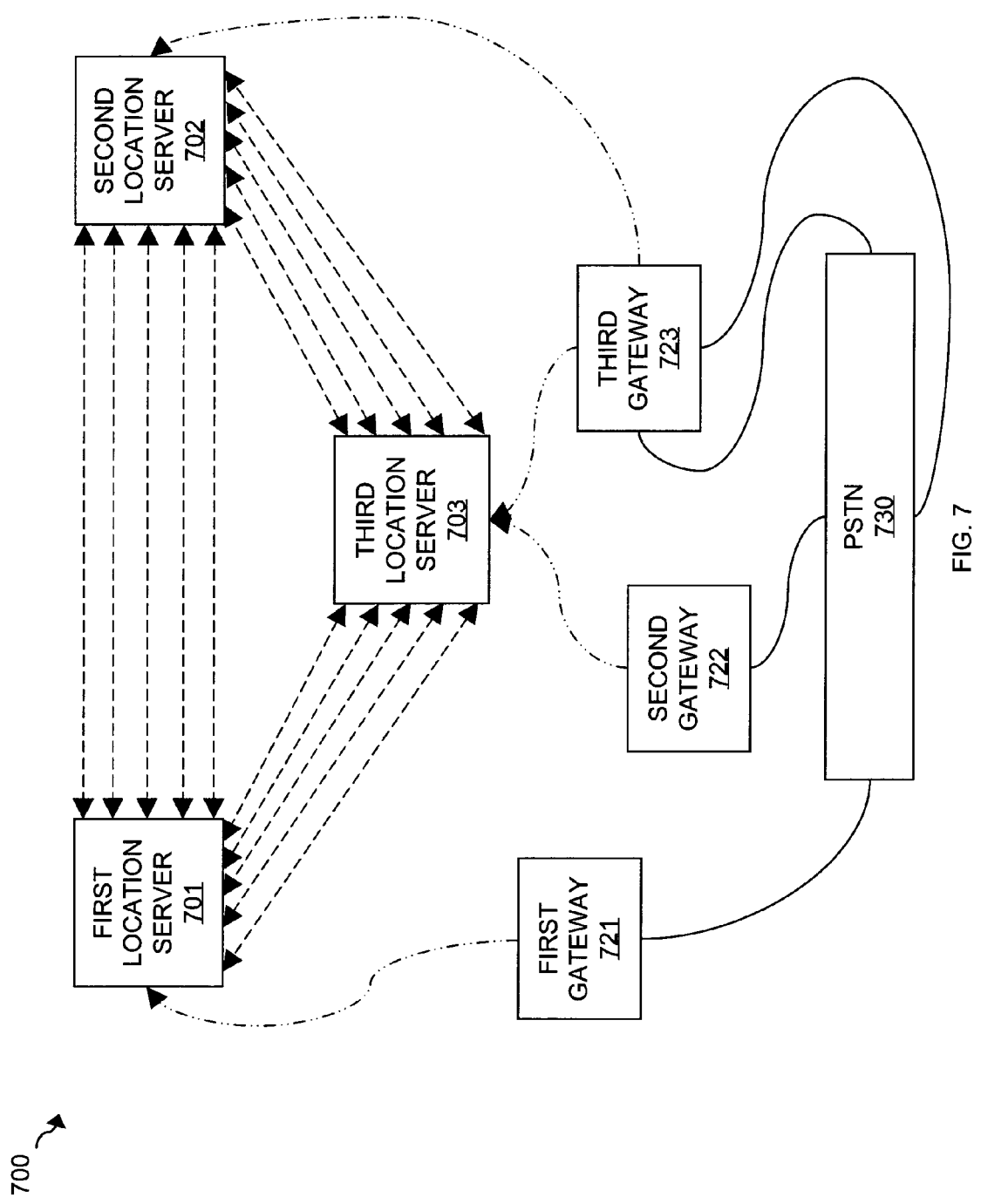
FIG. 7 illustrates an update messaging system in an embodiment of the invention.

FIG. 7 illustrates update messaging system 700 in an embodiment of the invention. Update messaging system 700 comprises first location server 701, second location server 702, third location server 703, first gateway 721, second gateway 722, third gateway 723, and PSTN 730. First, second, and third location servers 701, 702, 703 are in communication via SIP/IP messaging. First gateway 721 is in communication with first location server 701 by TRIP over SCTP messaging. Third location server 703 is in communication with both second gateway 722 and third gateway 723 by TRIP over SCTP messaging. First, second, and third gateways 721, 722, 723 are connected to PSTN 730 by trunk connections, for example by ISDN lines. Third gateway 723 is connected to two points on PSTN 730. The two points could represent two different area codes serviced by third gateway 723. Similarly, first and second gateways 701, 703 are connected to single points on PSTN 730 which could each represent an area code of PSTN 730. Furthermore, first, second, and third gateways 721, 722, 723 are in communication with PSTN 730 over SS7 signaling or another similar signaling protocol. Third gateway 723 is also in communication with second location server 702 by TRIP over SCTP messaging. First, second, and third location servers. 701, 702, 703 comprise TRIP enabled location servers. First, second, and third gateways 721, 722, 723 comprise TRIP-lite enabled media gateways.

The following describes update messaging system 700 in operation. It should be noted that the specific sequence of status changes and update messages are not determinative of the operation of media gateway update system. In operation, first gateway 721 undergoes a status change. Second gateway 722 and third gateway 723 also undergo status changes. First gateway 721 sends an update message to first location server 701. Second gateway 722 and third gateway 723 each send an update message to third location server 703. Third gateway 723 also sends an update message to second location server 702.

Each update message transmitted from each gateways 701, 702, 703 could indicate a gateway coming online, having a route through a gateway fail, adding new routes through a gateway, instructing a location server to keep alive previous messages, notifying a location server of dynamic resource statistics, or performing load balancing processes. Each update message could indicate other status information and are not limited to indicating the examples provided herein. For example, third gateway 723 could send an update message to second and third locations servers 702, 703 indicating that a route to one of the area codes of PSTN 730 serviced by gateway 723 has failed. Simultaneously, second gateway 722 could send an update message to second location server 702 indicating a low call volume through gateway 722.

Second location server 702 receives both update messages from second gateway 702 and third gateway 703. Second location sever 702 determines a priority associated with each of the update messages. In this example, second location server. 702 allocates a higher priority to the route failure update message transmitted from third gateway 703 than the low call volume update message transmitted from second gateway 702. Assuming second location server 702 is in congestion, it will drop the low call volume update message in favor of the failure update message. Next, second location server 702 will process the route failure message from third gateway 723 and update a gateway routing table indicating the failed route to the one of the two area codes serviced by third gateway 723.

All three location servers 701, 702, 703 periodically transmit update messages to each other to update the status of gateways 721, 722, 723. For example, second and third location servers 702, 703 do not receive update messages directly from first gateway 721. Rather, they receive update messages related to first gateway 721 when first location server 701 floods second and third location servers 702, 703 with update messages.

Update Messaging System

FIG. 8

Figure 8:
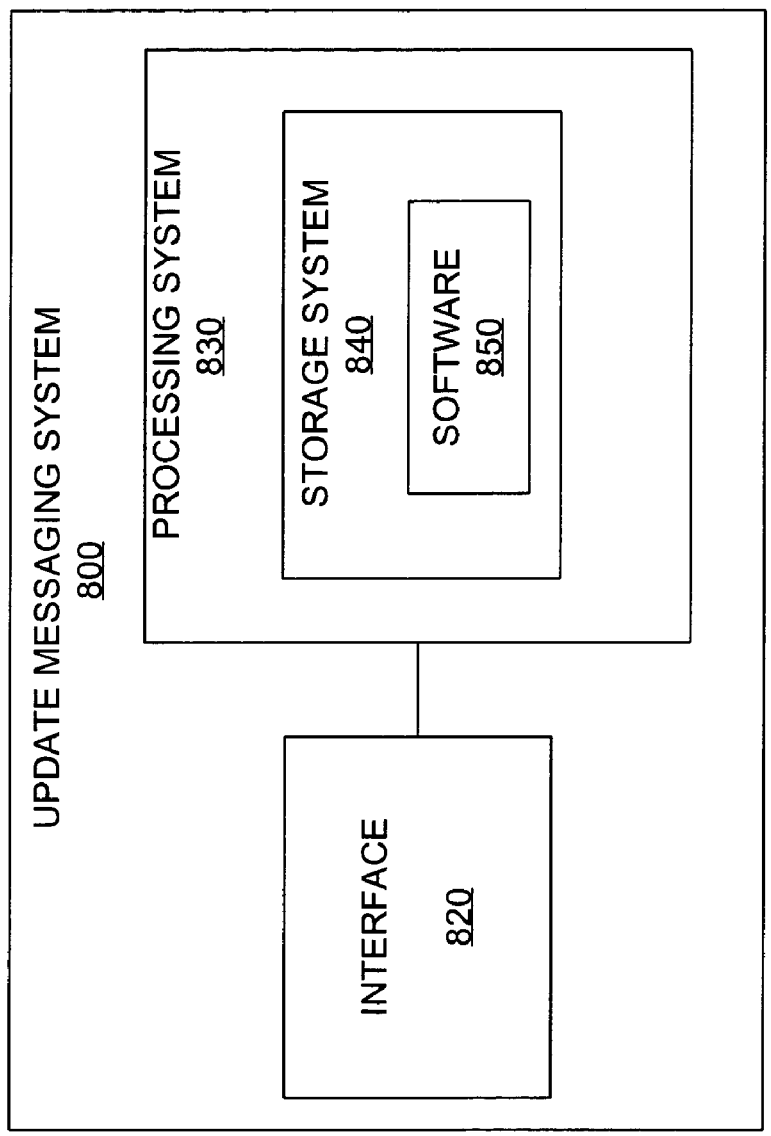
FIG. 8 illustrates an update messaging system in an embodiment of the invention.

FIG. 8 illustrates update messaging system 800 in an embodiment of the invention. Update messaging system 800 includes interface 820, processing system 830, storage system 840, and software 850. Storage system 840 stores software 850. Processing system 830 is linked to interface 820. Update messaging system 800 could be comprised of a programmed general-purpose computer, although those skilled in the art will appreciate that programmable or special purpose circuitry and equipment may be used. Update messaging system 800 may use a client server architecture where operations are distributed among a server system and client devices that together comprise elements 820-850.

Interface 820 could comprise a network interface card, modem, port, or some other communication device. Signaling interface 820 may be distributed among multiple communication devices. Interface 830 could comprise a computer microprocessor, logic circuit, or some other processing device. Processing system 830 may be distributed among multiple processing devices. Storage system 840 could comprise a disk, tape, integrated circuit, server, or some other memory device. Storage system 840 may be distributed among multiple memory devices.

Processing system 830 retrieves and executes software 850 from storage system 840. Software 850 may comprise an operating system, utilities, drivers, networking software, and other software typically loaded onto a general-purpose computer. Software 850 could also comprise an application program, firmware, or some other form of machine-readable processing instructions. When executed by the processing system 830, software 850 directs processing system 830 to operate as described for update messaging systems 200, 500, 600 and 700.

What is claimed is:

1. A method of operating an update messaging system, the method comprising:
   in a location server, receiving an update message from a gateway wherein the update message indicates a type of message for the update message;
   determining a priority associated with the update message based upon the type of message for the update message; and
   in response to message congestion in the location server, dropping the update message if the priority associated with the update message requires dropping the update message.

2. The method of claim 1 further comprising, in the location server, receiving a second update message from the gateway wherein the second update message indicates a second type message for the second update message.

3. The method of claim 2 further comprising determining a priority associated with the second update message based upon the second type of message for the second update message.

4. The method of claim 3 further comprising dropping, in response to the message congestion in the location server, one of either the update message or the second update message in order of the priorities associated with the update message and the second update message.

5. The method of claim 1 further comprising, in the location server, receiving a third update message from a second gateway wherein the third update message indicates a third type of message for the third update message and determining a priority associated with the third update message based upon the third type of message for the third update message.

6. The method of claim 5 further comprising dropping, in response to the message congestion in the location server, one of either the update message or the third update message in order of the priorities associated with the update message and the third update message.

7. The method of claim 1 further comprising, in a second location server, receiving a fourth update message from the gateway wherein the fourth update message indicates the type of message for the fourth update message, and determining a priority associated with the fourth update message based upon the type of message for the fourth update message.

8. The method of claim 7 further comprising dropping, in response to message congestion in the second location server, the fourth update message if the priority associated with the fourth update message requires dropping the fourth update message.

9. The method of claim 7 further comprising, in the second location server, receiving a fifth update message from the gateway wherein the fifth update message indicates a fifth type of message for the fifth update message.

10. The method of claim 9 further comprising determining a priority associated with the fifth update message based upon the fifth type of message for the fifth update message.

11. The method of claim 10 further comprising dropping, in response to message congestion in the second location server, one of either the fourth update message or the fifth update message in order of the priorities associated with the fourth update message and the fifth update message.

12. The method of claim 1 further comprising updating a routing table with information delivered in the update message.

13. The method of claim 1 comprising receiving the update message into the location server utilizing a stream control transport protocol (SCTP).

14. The method of claim 1 wherein the media gateway comprises a telephony routing over internet protocol-lite (TRIP-lite) enabled gateway.

15. The method of claim 1 wherein the location server comprises a telephony routing over internet protocol (TRIP) enabled location server.

16. The method of claim 1 wherein the type indicates a route failure.

17. The method of claim 1 wherein the type indicates adding new routes.

18. The method of claim 1 wherein the type indicates keep alive messaging.

19. The method of claim 1 wherein the type indicates dynamic resource statistics.

20. The method of claim 1 wherein the type indicates load balancing statistics.

21. An update messaging system comprising:
   an interface configured to receive an update message from a gateway into a location server wherein the update message indicates a type of message for the update message;
   a processing system configured to determine a priority associated with the update message based upon the type of message for the update message and configured to drop, in response to message congestion in the location server, the update message if the priority associated with the update message requires dropping the update message.

22. The system of claim 21 wherein the interface is further configured to receive a second update message from the gateway wherein the second update message indicates a second type message for the second update message.

23. The system of claim 22 wherein the processing system is further configured to determine a priority associated with the second update message based upon the second type of message for the second update message.

24. The system of claim 23 wherein the processing system is further configured to drop, in response to the message congestion in the location server, one of either the update message or the second update message in order of the priorities associated with the update message and the second update message.

25. The system of claim 21 wherein the interface is further configured to receive a third update message from a second gateway wherein the third update message indicates a third type of message for the third update message and wherein the processing system is further configured to determine a priority associated with the third update message based upon the third type of message for the third update message.

26. The system of claim 25 wherein the processing system is further configured to drop, in response to the message congestion in the location server, one of either the update message or the third update message in order of the priorities associated with the update message and the third update message.

27. The system of claim 21 further comprising a second interface configured to receive a fourth update message from the gateway into a second location server wherein the fourth update message indicates the type of message for the fourth update message, and further comprising a second processing system configured to determine a priority associated with the fourth update message based upon the type of message for the fourth update message.

28. The system of claim 27 wherein the second processing system is further configured to drop, in response to message congestion in the second location server, the fourth update message if the priority associated with the fourth update message requires dropping the fourth update message.

29. The system of claim 27 wherein the second interface is further configured to receive a fifth update message from the gateway wherein the fifth update message indicates a fifth type of message for the fifth update message.

30. The system of claim 29 wherein the second processing system is further configured to determine a priority associated with the fifth update message based upon the fifth type of message for the fifth update message.

31. The system of claim 30 wherein the second processing system is further configured to drop, in response to message congestion in the second location server, one of either the fourth update message or the fifth update message in order of the priorities associated with the fourth update message and the fifth update message.

32. The system of claim 21 wherein the processing system is further configured to update a routing table with information delivered in the update message.

33. The system of claim 21 wherein the interface receives the update message into the location server utilizing a stream control transport protocol (SCTP).

34. The system of claim 21 wherein the gateway comprises a telephony routing over internet protocol-lite (TRIP-lite) enabled gateway.

35. The system of claim 21 wherein the location server comprises a telephony routing over internet protocol (TRIP) enabled location server.

36. The system of claim 21 wherein the type indicates a route failure.

37. The system of claim 21 wherein the type indicates adding new routes.

38. The system of claim 21 wherein the type indicates keep alive messaging.

39. The system of claim 21 wherein the type indicates dynamic resource statistics.

40. The system of claim 21 wherein the type indicates load balancing statistics.

* * * * *

UNITED STATES PATENT AND TRADEMARK OFFICE
CERTIFICATE OF CORRECTION

PATENT NO. : 7,624,175 B1  Page 1 of 1
APPLICATION NO. : 10/700187
DATED : November 24, 2009
INVENTOR(S) : Schlesener et al.

It is certified that error appears in the above-identified patent and that said Letters Patent is hereby corrected as shown below:

Column 3, Line 30, "if" should read --of--

Column 3, Line 33, "if" should read --of--

Column 3, Line 36, "if" should read --of--

Column 3, Line 39, "if" should read --of--

Column 3, Line 41, "if" should read --of--

Column 3, Line 43, "if" should read --of--

Column 3, Line 45, "if" should read --of--

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,624,175 B1
APPLICATION NO. : 10/700187
DATED : November 24, 2009
INVENTOR(S) : Schlesener et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1725 days.

Signed and Sealed this

Twenty-sixth Day of October, 2010

David J. Kappos
*Director of the United States Patent and Trademark Office*